Dec. 8, 1970
3,545,844
Filed June 26, 1968
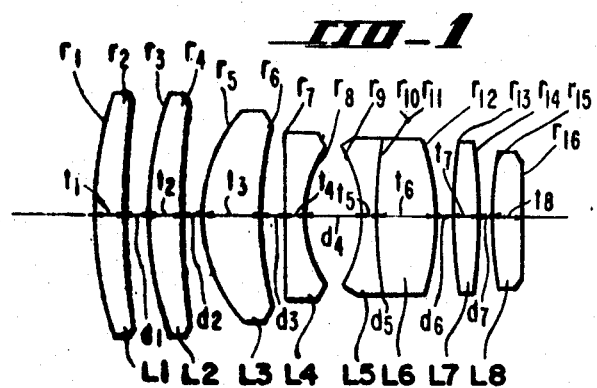
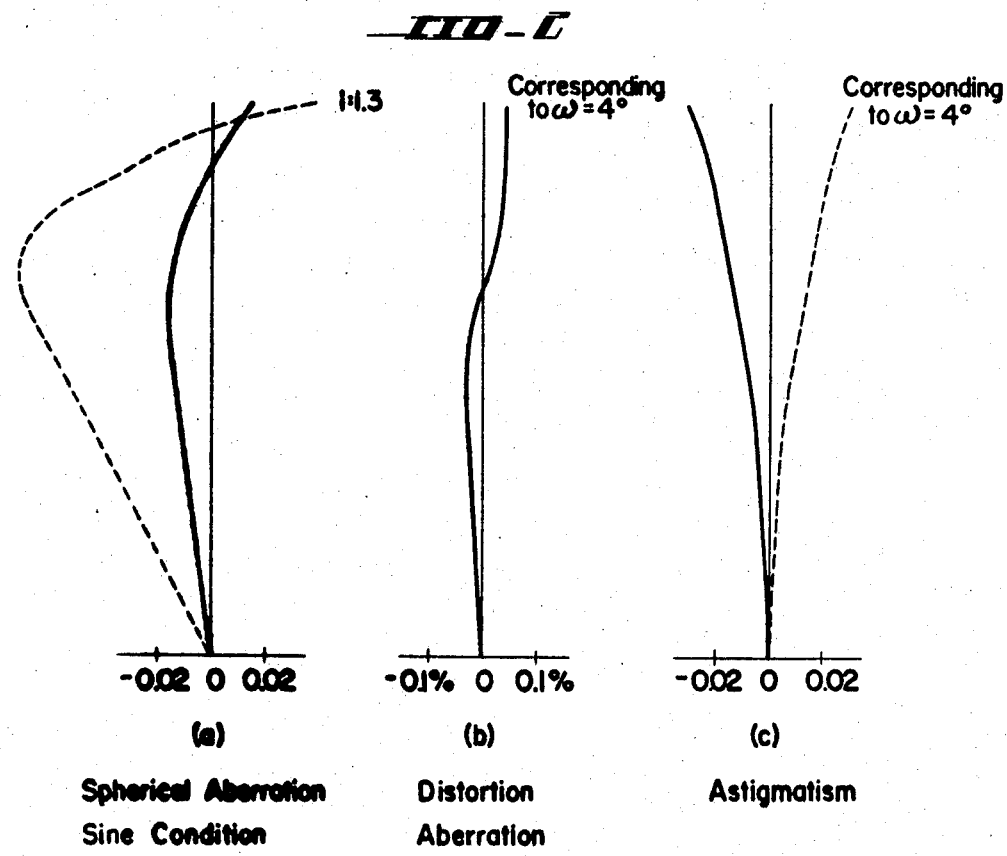
(a) Spherical Aberration Sine Condition
(b) Distortion Aberration
(c) Astigmatism
INVENTORS
YASUO TAKAHASHI
FUJIO TAZUMI
BY Stanley Wolder
ATTORNEY United States Patent Office 3,545,844
Patented Dec. 8, 1970

3,545,844
HIGH RESOLUTION OBJECTIVE LENS SYSTEM
Yasuo Takahashi, Tokyo-to, and Fujio Tazumi, Fukuoka-machi, Iruma-gun, Japan, assignors to Asahi Kogaku Kogyo Kabushiki Kaisha, Tokyo-to, Japan, a corporation of Japan
Filed June 26, 1968, Ser. No. 740,316
Claims priority, application Japan, July 19, 1967, 42/46,487
Int. Cl. G02b 9/00, 9/64
U.S. Cl. 350—214  1 Claim

ABSTRACT OF THE DISCLOSURE

A high resolution large aperture objective lens system comprises eight consecutively designated lenses and satisfies the following conditions:

$$F/0.9 < F_{1,2} < F/0.6$$
$$F/1.6 < F_{1,2,3} < F/1.2$$
$$F/0.5 < F_{1,2,3,4} < F/0.3$$
$$0.38F < |r_9| < 0.45F,\ r_9 < 0$$
$$F < r_{10} < 2.5F$$
$$0.15 < n_6 - n_5 < 0.3$$
$$F/0.8 < F_{1,2,3,4,5,6,7} < F/0.65$$

wherein F is the resultant focal length of the lens system; $F_{1,2,\ldots,i}$ is the resultant focal length of the first to the $i$th lens; $r_9$ and $r_{10}$ are the radii of curvature of the front and rear faces respectively of the fifth lens; and $n_5$ and $n_6$ are the indices of refraction of the fifth and sixth lenses respectively.

BACKGROUND OF THE INVENTION

The present invention relates generally to improvements in lens systems and it relates more particularly to an improved objective lens system having a resolving power closely approaching the theoretical limit thereof.

In an objective lens system the residual spherical aberration generally increases as the object brightness increases. In order to remedy such disadvantage it is conventional to minimize the curvatures of the various lens surfaces by increasing the number of lenses employed or by using lens materials of higher refractive indices. However, the correction of spherical aberration which can be practically effected by these expedients, particularly in lens systems of high aperture, is limited, as is the resolving power of the resulting lens system.

SUMMARY OF THE INVENTION

It is a principal object of the present invention to provide an improved lens system.

Another object of the present invention is to provide an improved objective lens system of high resolution.

Still another object of the present invention is to provide a highly corrected camera objective lens system.

A further object of the present invention is to provide an improved large aperture objective lens system of a resolving power approximating its theoretical limit.

The above and other objects of the present invention will become apparent from a reading of the following description taken in conjunction with the accompanying drawing.

In a sense the present invention contemplates the provision of a lens system comprising eight lenses and possessing the following characteristics:

(1)  $F/0.9 < F_{1,2} < F/0.6$
(2)  $F/1.6 < F_{1,2,3} < F/1.2$
(3)  $F/0.5 < F_{1,2,3,4} < F/0.3$
(4)  $0.38F < |r_9| < 0.45F,\ r_9 < 0$
(5)  $F < r_{10} < 2.5F$
(6)  $0.15 < n_6 - n_5 < 0.3$
(7)  $F/0.8 < F_{1,2,3,4,5,6,7} < F/0.65$ wherein the lenses are herein successively designated as 1 to 8 and F is the resultant focal length of the lens system; $F_{1,2,\ldots,i}$ is the resultant focal length of the first to the $i$th lens; $r_9$ is the radius of curvature of the fifth lens front face and $r_{10}$ is the radius of curvature of the fifth lens rear face and sixth lens front face; and $n_5$ and $n_6$ are the indices of refraction of the fifth and sixth lenses respectively.

The very high resolving power of the improved lens system is achieved through the application of a spherical aberration coefficient of a higher order as well as the other expedients of low curvature lens faces through the use of a large number of lenses and lens materials of high refractive indices.

The improved lens system is advantageously employed with an $f$ number not exceeding 1:1.8 and the first three lenses are positive meniscus lenses with convex front faces, the fourth lens is a negative meniscus lens with a concave rear face, the fifth and sixth lenses are negative and positive respectively with cemented mating confronting faces to form a unitary group and the seventh and eighth lenses are positive. A diaphragm is advantageously positioned between the fourth and fifth lenses.

The condition (1) in association with the conditions (2) and (3), establishes the power of the front lens group to eliminate the residual aberration thereof. An excessive lens power would make it impossible to remove the remaining aberration of the zonal part and thereunder, while too low a lens power would make the negative power of the fourth lens too small and unbalance the aberrations. If a greater negative power should be provided to the fourth lens so as to counteract the condition (3), an excessive burden would be imposed on the positive lenses of the rear group. The condition (4) functions to overcorrect the spherical aberration. Excessive application of the condition would cause an increase in the remaining aberration, while the object would not be attained if a sufficient application of this condition should not be made. Further, this condition inevitably influences the effect of the tenth lens surface which is an important feature of the lens system of the present invention. The conditions (5) and (6) define the aforesaid feature and this refracting power greatly influences the state of the spherical aberration.

In connection with the spherical aberration coefficients of higher order, as hereinafter set forth, it should be noted that, as to the higher order coefficients of the tenth surface, while the third order coefficient is of relatively small positive value, the ninth order coefficient is of relatively large value as compared with the coefficients of the other surfaces. Such is not the case with the eleventh surface but it is expected that, if still higher aberration coefficients can be computed a rapid increase in the value would appear as the order becomes higher. In any case, however, these are under the influence of the conditions (5) and (6). The condition (7) is necessary for providing the thirteenth surface, that is, the seventh lens rear face, with a suitable power so as to relieve the eleventh or the fifteenth surface, that is, the sixth lens rear face or eighth lens rear face, cause the higher order aberration coefficient to act and diminish the remaining aberration, thus making the spherical aberration small.

BRIEF DESCRIPTION OF THE DRAWING

FIG. 1 is a longitudinal sectional views of an objective lens system embodying the present invention; and FIG. 2 is the aberration curves thereof with respect to an object at a distance of about 50 times the lens system focal length, the curve (a) illustrating the spherical aberration and sine condition, the curve (b) illustrating the distortion aberration, and the curve (c) illustrating the astigmatism aberration, the solid lines and the broken lines corresponding respectively to the sagittal and the meridianal image planes.

DESCRIPTION OF THE PREFERRED EMBODIMENT

Referring now to the drawings which illustrate a preferred embodiment of the present invention and the aberration curves thereof, the improved lens system comprises eight lenses including:

A first positive meniscus lens L1 having an index of refraction $n_1$, an Abbe number or $\nu$ value $V_1$, a thickness $t_1$, a front convex first surface of radius of curvature $r_1$, and a rear concave second surface of radium of curvature $r_2$;

A second positive meniscus lens L2 spaced from lens L1 a distance $d_1$, and having an index of refraction $n_2$, an Abbe number $V_2$, a thickness $t_2$, a front convex third surface of radius of curvature $r_3$, and a rear concave fourth surface of radius of curvature $r_4$;

A third positive meniscus lens L3 spaced from lens L2 a distance $d_2$ and having an index of refraction $n_3$, an Abbe number $V_3$, a thickness $t_3$, a front convex fifth surface of radius of curvature $r_5$, and a rear concave sixth surface of radius of curvature $r_6$;

A fourth negative meniscus lens L4 spaced from lens L3 a distance $d_3$ and having an index of refraction $n_3$, an Abbe number $V_4$, a thickness $t_4$, a front convex seventh surface of radius of curvature $r_7$, and a rear concave eighth surface of radius of curvature $r_8$;

A fifth negative lens L5 spaced from lens L4 a distance $d_4$ and having an index of refraction $n_5$, an Abbe number $V_5$, a thickness $t_5$, a front concave ninth surface of radius of curvature $r_9$ and a rear concave tenth surface of radius of curvature $r_{10}$;

A sixth positive lens L6 cemented to and forming a unitary group with lens L5 and having an index of refraction $n_6$, an Abbe number $V_6$, a convex front surface of radius of curvature $r_{11}$ equal to $r_{10}$ mating and directly cemented to the concave lens tenth surface, and a rear convex eleventh surface having a radius of curvature $r_{12}$;

A seventh positive lens L7 spaced from lens L6 a distance $d_6$ and having an index of refraction $n_7$, an Abbe number $V_7$, a front convex twelfth surface having a radius of curvature $r_{13}$ and a rear convex thirteenth surface having a radius of curvature $r_{14}$; and An eighth positive lens L8 spaced from lens L7 a distance $d_7$ and having an index of refraction $n_8$, an Abbe number $V_8$, a front convex fourteenth surface having a radius of curvature $r_1$ and a rear convex fifteenth surface having a radius of curvature $r_{16}$.

It should be noted that in the designations employed herein including the tables, the first to the ninth lens faces correspond respectively to the first to the ninth lens surfaces and the twelfth to the sixteenth lens faces correspond to the eleventh to fifteenth lens surfaces, whereas the coinciding tenth and eleventh lens faces correspond to the tenth lens surface; the distances between lenses are axially measured between the confronting faces of adjacent lenses and the lens thicknesses are also axially measured.

The following Table 1 sets forth the lens face radii of curvature, the lens spacings and thicknesses, the lens $e=$ line indices of refraction and the Abbe numbers or $\nu$ values of a specific example of the lens system illustrated in FIG. 1 and having a focal length $F=100$ and an $f$ number of 1:1.3; Table 2 sets forth the Seidel's coefficients and their respective sums and Table 3 sets forth the higher order spherical aberration coefficients and the respective sums thereof of the specific example of the improved lens system.

TABLE I.—LENS DATA

| Lens | Surface No. | r | d | | |
|---|---|---|---|---|---|
| L1 | 1 | $r_1=155.0$ | $t_1=10.20$ | $n_1=1.77252$ | |
|    | 2 | $r_2=449.3$ | $d_1=0.24$ | $V_1=49.6$ | |
| L2 | 3 | $r_3=123.0$ | $t_2=12.00$ | $n_2=1.73232$ | |
|    | 4 | $r_4=413.3$ | $d_2=0.24$ | $V_2=54.8$ | |
| L3 | 5 | $r_5=57.0$ | $t_3=17.70$ | $n_3=1.67280$ | |
|    | 6 | $r_6=114.5$ | $d_3=7.17$ | $V_3=57.3$ | |
| L4 | 7 | $r_7=220.4$ | $t_4=5.40$ | $n_4=1.81262$ | |
|    | 8 | $r_8=36.8$ | $d_4=18.00$ | $V_4=25.5$ | |
| L5 | 9 | $r_9=-41.5$ | $t_5=4.00$ | $n_5=1.57046$ | |
|    | 10 | $r_{10}=143.0$ | $d_5=0.00$ | $V_5=42.8$ | |
| L6 | 10 | $r_{11}=143.0$ | $t_6=18.00$ | $n_6=1.79025$ | |
|    | 11 | $r_{12}=-68.8$ | $d_6=0.20$ | $V_6=50.1$ | |
| L7 | 12 | $r_{13}=375.8$ | $t_7=8.00$ | $n_7=1.79025$ | |
|    | 13 | $r_{14}=-153.3$ | $d_7=0.20$ | $V_7=50.1$ | |
| L8 | 14 | $r_{15}=167.7$ | $t_8=8.00$ | $n_8=1.77752$ | |
|    | 15 | $r_{16}=-2058.7$ | | $V_8=50.6$ | |

NOTE.—$n=e=$line refractive index; V:$\nu_d$.

TABLE II.—SEIDEL'S COEFFICIENTS

| Surface No.: | $S_1$ | $S_2$ | $S_3$ | P | $S_4$ |
|---|---|---|---|---|---|
| 1 | 0.066 | 0.102 | 0.158 | 0.281 | 0.683 |
| 2 | 0.002 | −0.020 | 0.177 | −0.097 | −0.698 |
| 3 | −0.005 | −0.013 | −0.032 | 0.343 | 0.723 |
| 4 | 0.113 | −0.220 | 0.427 | −0.102 | −0.630 |
| 5 | −0.063 | −0.092 | −0.135 | 0.705 | 0.831 |
| 6 | 0.323 | −0.483 | 0.724 | −0.351 | −0.558 |
| 7 | −0.698 | 0.686 | −0.675 | 0.203 | 0.463 |
| 8 | −0.086 | −0.180 | −0.378 | −1.218 | −3.342 |
| 9 | −0.617 | 0.049 | −0.003 | −0.875 | 0.070 |
| 10 | 0.019 | 0.069 | 0.253 | 0.054 | 1.116 |
| 11 | 0.310 | 0.006 | 0.000 | 0.641 | 0.013 |
| 12 | −0.006 | 0.042 | −0.267 | 0.117 | 0.935 |
| 13 | 0.349 | 0.005 | 0.000 | 0.287 | 0.004 |
| 14 | −0.044 | 0.114 | −0.291 | 0.260 | 0.079 |
| 15 | 0.329 | −0.024 | 0.001 | 0.021 | −0.009 |
| Sum | −0.009 | 0.040 | −0.041 | 0.274 | −0.301 |

TABLE III.—HIGHER ORDER SPHERICAL ABERRATION COEFFICIENTS

| Surface No. | 5th order | 7th order | 9th order |
|---|---|---|---|
| 1 | 0.007 | 0.002 | 0.000 |
| 2 | 0.001 | 0.000 | 0.000 |
| 3 | −0.000 | 0.000 | 0.000 |
| 4 | 0.042 | 0.024 | 0.013 |
| 5 | −0.012 | 0.004 | 0.012 |
| 6 | 0.221 | 0.227 | 0.211 |
| 7 | −0.419 | −0.352 | −0.256 |
| 8 | −0.076 | −0.140 | −0.242 |
| 9 | −0.308 | −0.232 | 0.048 |
| 10 | 0.050 | 0.154 | 0.352 |
| 11 | 0.089 | 0.094 | 0.194 |
| 12 | 0.020 | −0.008 | −0.062 |
| 13 | 0.130 | 0.044 | −0.000 |
| 14 | 0.017 | 0.047 | 0.021 |
| 15 | 0.175 | 0.109 | 0.014 |
| Sum | −0.060 | −0.022 | 0.309 |

An inspection of the aberration curves in FIG. 2 illustrates the high degree of correction of aberrations which have been achieved with the improved lens system and the consequent very high degree of resolution.

While there has been described and illustrated a preferred embodiment of the present invention, it is apparent that numerous alterations, omissions, and additions may be made without departing from the spirit thereof.

What is claimed:
1. A lens system having an $f$ number not exceeding 1:1.8 and a focal length of 100 and comprising eight lenses herein successively designated as 1 to 8 with the fifth and sixth lenses forming a cemented doublet, said lens system possessing the following dimensions and relationships:

| | | |
|---|---|---|
| $r_1 = 155.0$ | $t_1 = 10.20$ | $n_1 = 1.77252$ |
| $r_2 = 449.3$ | $d_1 = 0.24$ | $V_1 = 49.6$ |
| $r_3 = 123.0$ | $t_2 = 12.00$ | $n_2 = 1.73232$ |
| $r_4 = 413.3$ | $d_2 = 0.24$ | $V_2 = 54.8$ |
| $r_5 = 57.0$ | $t_3 = 17.70$ | $n_3 = 1.67280$ |
| $r_6 = 114.5$ | $d_3 = 7.17$ | $V_3 = 57.3$ |
| $r_7 = 220.4$ | $t_4 = 5.40$ | $n_4 = 1.81262$ |
| $r_8 = 36.8$ | $d_4 = 18.00$ | $V_4 = 25.5$ |
| $r_9 = -41.5$ | $t_5 = 4.00$ | $n_5 = 1.57046$ |
| $r_{10} = 143.0$ | $d_5 = 0.00$ | $V_5 = 42.8$ |
| $r_{11} = 143.0$ | $t_6 = 18.00$ | $n_6 = 1.79025$ |
| $r_{12} = -68.8$ | $d_6 = 0.20$ | $V_6 = 50.1$ |
| $r_{13} = 375.8$ | $t_7 = 8.00$ | $n_7 = 1.79025$ |
| $r_{14} = -153.3$ | $d_7 = 0.20$ | $V_7 = 50.1$ |
| $r_{15} = 167.7$ | $t_8 = 8.00$ | $n_8 = 1.77752$ |
| $r_{16} = -2058.7$ | | $V_8 = 50.6$ | wherein $r_j$ is the radius of curvature of the $j$th lens face, the lens faces being successively designated from the first lens front face to the eighth lens rear face, $t_i$ is the thickness of the $i$th lens, $d_i$ is the axial distance between the rear face of the $i$th lens and the front face of the next successive lens, $n_i$ is the index of refraction of the $i$th lens, and $V_i$ is the Abbe number of the $i$th lens.

References Cited

UNITED STATES PATENTS 3,351,412  11/1967  Solisch et al. _____ 350—214X

FOREIGN PATENTS 22,079  10/1964  Japan _____ 350—214

DAVID SCHONBERG, Primary Examiner

P. A. SACHER, Assistant Examiner